Patented Oct. 23, 1934

1,977,973

UNITED STATES PATENT OFFICE 1,977,973

TREATMENT OF SKINS AND HIDES

Otto Röhm, Darmstadt, Germany

No Drawing. Application June 17, 1933, Serial No. 676,319. In Germany June 20, 1927

7 Claims. (Cl. 149—2)

My invention relates to the treatment of skins and hides and more particularly to tawing or tanning operations by means of mineral tanning solutions, such as described in my application, Serial No. 278,045, filed on May 15, 1928 and corresponding to an application which I filed in Germany on June 20, 1927.

By the addition of sodium carbonate or waterglass, solutions of iron salts can be made basic. However, liquors neutralized with sodium carbonate are easily subject to hydrolysis when ferric hydroxid is separated, whereas iron tanning liquors made basic with waterglass, after some time which varies according to the pH of the tanning liquor, become gelatinized.

Now, I have discovered that it is advantageous to subject skins and hides to a preliminary treatment in a bath which contains phosphoric acid and its derivatives, e. g. glycero-phosphoric acid (esters of the phosphoric acid), glycero-phosphate (salts of esters of phosphoric acid), because when the skins and hides thus preliminarily treated are placed in the iron tanning liquors, these neither flocculate nor become gelatinized, so that a uniform tanning is assured.

The skins which previously have been cleaned by well-known methods are moved in baths of corresponding compositions for one to two hours at 15° to 20° C., until the skins in section react slightly acid against litmus. The percentage figures mentioned in connection with the various kinds of baths refer to the weight of the skins (100%). After the treatment in the bath, the skins are immediately tanned.

Examples

A. Baths which are intended for skins, which subsequently shall be tanned with chromium salt, can have, for instance, any of the following compositions:

1

| | Per cent |
|---|---|
| Water | 100 |
| Common salt | 5 |
| Concentrated hydrochloric acid (25%) | 1 |
| Phosphoric acid | 0.3 |

2

| | Per cent |
|---|---|
| Water | 100 |
| Calcined sodium sulfate | 5 |
| Concentrated sulphuric acid (93%) | 0.5 |
| Phosphoric acid | 0.5 |

3

| | Per cent |
|---|---|
| Water | 100 |
| Common salt | 5 |
| Concentrated hydrochloric acid (25%) | 1 |
| Glycero-phosphoric acid | 0.3 |

4

| | Per cent |
|---|---|
| Water | 100 |
| Common salt | 5 |
| Concentrated hydrochloric acid (25%) | 1 |
| Anhydrous sodium glycero-phosphate | 0.38 |

5

| | Per cent |
|---|---|
| Water | 100 |
| Common salt | 5 |
| Concentrated hydrochloric acid (25%) | 1 |
| Diethyl phosphoric acid | 0.5 |

B. For leather that shall be made iron dressed, the following baths may be used for 100 parts of skins:

6

| | Per cent |
|---|---|
| Water | 100 |
| Calcined sodium sulfate | 5 |
| Concentrated sulfuric acid (93%) | 0.5 |
| Phosphoric acid | 1.75 |

7

| | Per cent |
|---|---|
| Water | 100 |
| Calcined sodium sulfate | 5 |
| Concentrated sulfuric acid (93%) | 0.5 |
| Glycero-phosphoric acid | 1.75 |

8

| | Per cent |
|---|---|
| Water | 100 |
| Calcined sodium sulfate | 5 |
| Concentrated sulfuric acid (93%) | 0.5 |
| Anhydrous sodium glycero-phosphate | 2.2 |

9

| | Per cent |
|---|---|
| Water | 100 |
| Calcined sodium sulfate | 5 |
| Concentrated sulfuric acid (93%) | 0.5 |
| Ethyl phosphoric acid | 2.2 |

C. For alum dressed leather the following baths may be used:

10

| | Per cent |
|---|---|
| Water | 100 |
| Calcined sodium sulfate | 5 |
| Concentrated sulfuric acid (93%) | 0.2 |
| Phosphoric acid | 0.5 |

11

| | Per cent |
|---|---|
| Water | 100 |
| Calcined sodium-sulfate | 5 |
| Concentrated sulfuric acid (93%) | 0.2 |
| Glycero-phosphoric acid | 0.5 |

12

| | Per cent |
|---|---|
| Water | 100 |
| Calcined sodium sulfate | 5 |
| Concentrated sulfuric acid (93%) | 0.2 |
| Anhydrous sodium glycero-phosphate | 0.63 |

13

| | Per cent |
|---|---|
| Water | 100 |
| Calcined sodium sulfate | 5 |
| Concentrated sulfuric acid (93%) | 0.2 |
| Ethyl phosphoric acid | 0.65 |

I claim:

1. In the treatment of skins and hides, the steps of first subjecting the skins and hides to preliminary treatment in a bath which contains phosphoric acid and subsequently subjecting the skins and hides to treatment in an iron tanning bath.

2. In the treatment of skins and hides, the steps of first subjecting the skins and hides to preliminary treatment in a bath which contains sodium phosphate and subsequently subjecting the skins and hides to treatment in an iron tanning bath.

3. In the treatment of skins and hides, the steps of first subjecting the skins and hides to preliminary treatment in a bath which contains derivatives of phosphoric acid and subsequently subjecting the skins and hides to treatment in an iron tanning bath.

4. In the treatment of skins and hides, the steps of first subjecting the skins and hides to preliminary treatment in a bath which contains esters of phosphoric acid and subsequently subjecting the skins and hides to treatment in an iron tanning bath.

5. In the treatment of skins and hides, the steps of first subjecting the skins and hides to preliminary treatment in a bath which contains glycero-phosphoric acid and subsequently subjecting the skins and hides to treatment in an iron tanning bath.

6. In the treatment of skins and hides, the steps of first subjecting the skins and hides to preliminary treatment in a bath which contains salts of esters of phosphoric acid and subsequently subjecting the skins and hides to treatment in an iron tanning bath.

7. In the treatment of skins and hides, the steps of first subjecting the skins and hides to preliminary treatment in a bath which contains sodium glycero-phosphate and subsequently subjecting the skins and hides to treatment in an iron tanning bath.

OTTO RÖHM.